(12) United States Patent
Cho

(10) Patent No.: US 10,456,928 B2
(45) Date of Patent: Oct. 29, 2019

(54) VACUUM GRIPPER UNIT COMPRISING VACUUM PUMP

(71) Applicant: VTEC CO., LTD., Busan (KR)

(72) Inventor: Ho-Young Cho, Seoul (KR)

(73) Assignee: VTEC CO., LTD., Sasang-Gu, Busan (KR)

( * ) Notice: Subject to any disclaimer, the term of this patent is extended or adjusted under 35 U.S.C. 154(b) by 0 days.

(21) Appl. No.: 16/078,564

(22) PCT Filed: Feb. 6, 2017

(86) PCT No.: PCT/KR2017/001246
§ 371 (c)(1),
(2) Date: Aug. 21, 2018

(87) PCT Pub. No.: WO2017/159986
PCT Pub. Date: Sep. 21, 2017

(65) Prior Publication Data
US 2019/0054635 A1    Feb. 21, 2019

(30) Foreign Application Priority Data
Mar. 15, 2016 (KR) .................. 10-2016-0030778

(51) Int. Cl.
*B25J 15/06* (2006.01)
*B65G 47/91* (2006.01)

(52) U.S. Cl.
CPC .......... *B25J 15/0616* (2013.01); *B25J 15/06* (2013.01); *B65G 47/91* (2013.01)

(58) Field of Classification Search
CPC ............. B25J 15/0616; B25J 15/0625; B25J 15/0633; B25J 15/0675; B25J 15/06;
(Continued)

(56) References Cited

U.S. PATENT DOCUMENTS 4,852,926 A  8/1989 Littell
4,957,318 A  9/1990 Blatt
(Continued)

FOREIGN PATENT DOCUMENTS

KR  20090131617 A  12/2009
KR  100968437 B1  7/2010
KR  101019948 B1  3/2011

OTHER PUBLICATIONS

International Search Report & Written Opinion dated May 12, 2017 from corresponding PCT Application No. PCT/KR2017/001246.

*Primary Examiner* — Stephen A Vu
(74) *Attorney, Agent, or Firm* — Innovation Capital Law Group, LLP; Vic Lin

(57) ABSTRACT

The present invention relates to a vacuum gripper unit. The unit has a first mounting container and a second mounting container of cylindrical shapes formed in an H-type when seen from the outside, including a main body for providing a common vacuum chamber. A vacuum pump is inserted into the first mounting container, while the vacuum pump or a release valve is selectively mounted in the second mounting container. In addition, a front insertion hole of each of the first mounting container and the second mounting container is provided with a finishing material which supports each of the release valve and the vacuum pump that are mounted to thereby prevent the valve and pump from being separated. It is preferable that the finishing material of at least the first mounting container is a silencer.

10 Claims, 10 Drawing Sheets

(58) Field of Classification Search
CPC .......... B65G 47/91; B25B 11/007; F04F 5/20; F04F 5/52
See application file for complete search history.

(56) References Cited

U.S. PATENT DOCUMENTS

| | | | |
|---|---|---|---|
| 5,029,383 A | 7/1991 | Snyder et al. | |
| 5,172,922 A | 12/1992 | Kowaleski et al. | |
| 5,188,411 A | 2/1993 | Golden | |
| 5,190,332 A | 3/1993 | Nagai et al. | |
| 5,211,435 A * | 5/1993 | Nagai | B65G 47/91 |
| | | | 294/186 |
| 5,222,854 A | 6/1993 | Blatt et al. | |
| 5,333,456 A | 8/1994 | Bollinger | |
| 5,345,935 A | 9/1994 | Hirsch et al. | |
| 5,609,377 A | 3/1997 | Tanaka | |
| 5,617,338 A | 4/1997 | Sugano et al. | |
| 5,928,537 A | 7/1999 | Fortune | |
| 6,155,796 A | 12/2000 | Schmalz et al. | |
| 6,213,521 B1 | 4/2001 | Land et al. | |
| 6,283,246 B1 | 9/2001 | Nishikawa | |
| 6,318,433 B1 | 11/2001 | Reis et al. | |
| 6,364,054 B1 | 4/2002 | Bubulka et al. | |
| 6,437,560 B1 | 8/2002 | Kalb | |
| 6,454,333 B2 | 9/2002 | Portal | |
| 6,502,877 B2 | 1/2003 | Schick et al. | |
| 6,729,852 B2 | 5/2004 | Schnatterer | |
| 7,540,309 B2 | 6/2009 | Perlman et al. | |
| 7,681,603 B2 | 3/2010 | Perlman et al. | |
| 9,095,983 B2 | 8/2015 | Perlman et al. | |
| 2004/0094979 A1* | 5/2004 | Damhuis | B25J 15/0052 |
| | | | 294/65 |
| 2007/0006940 A1 | 1/2007 | Perlman et al. | |
| 2015/0336278 A1 | 11/2015 | Perlman et al. | |

* cited by examiner

[FIG. 1]
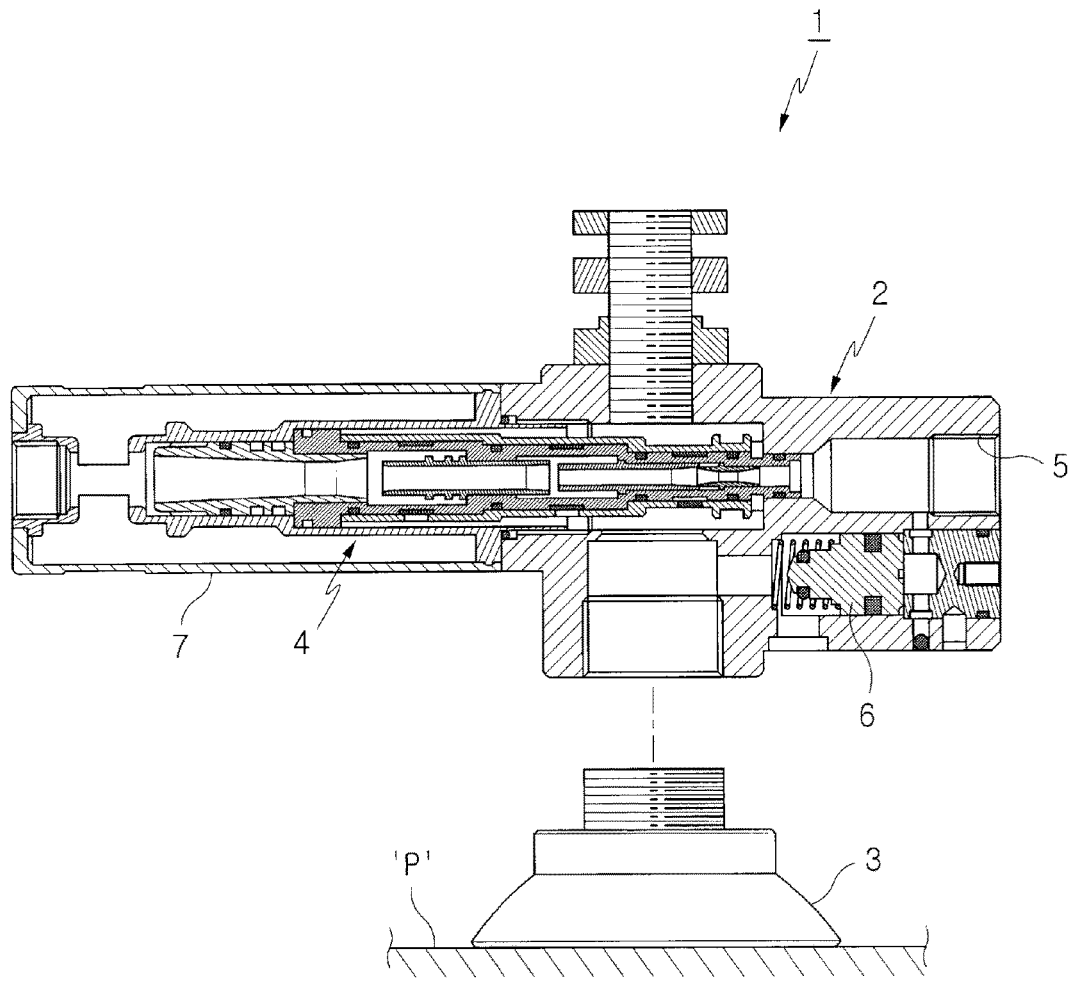

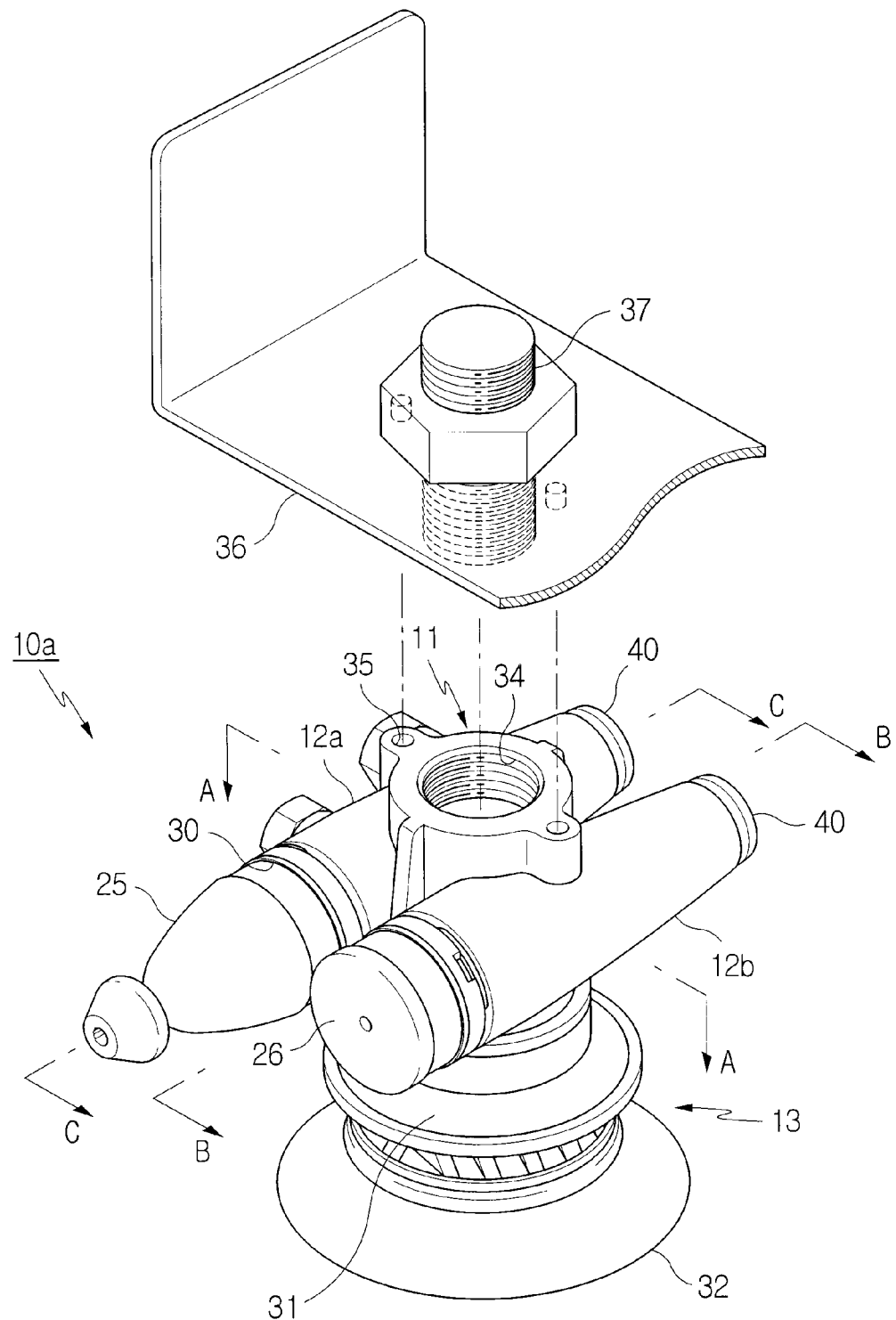
[FIG. 2]

[FIG. 3]
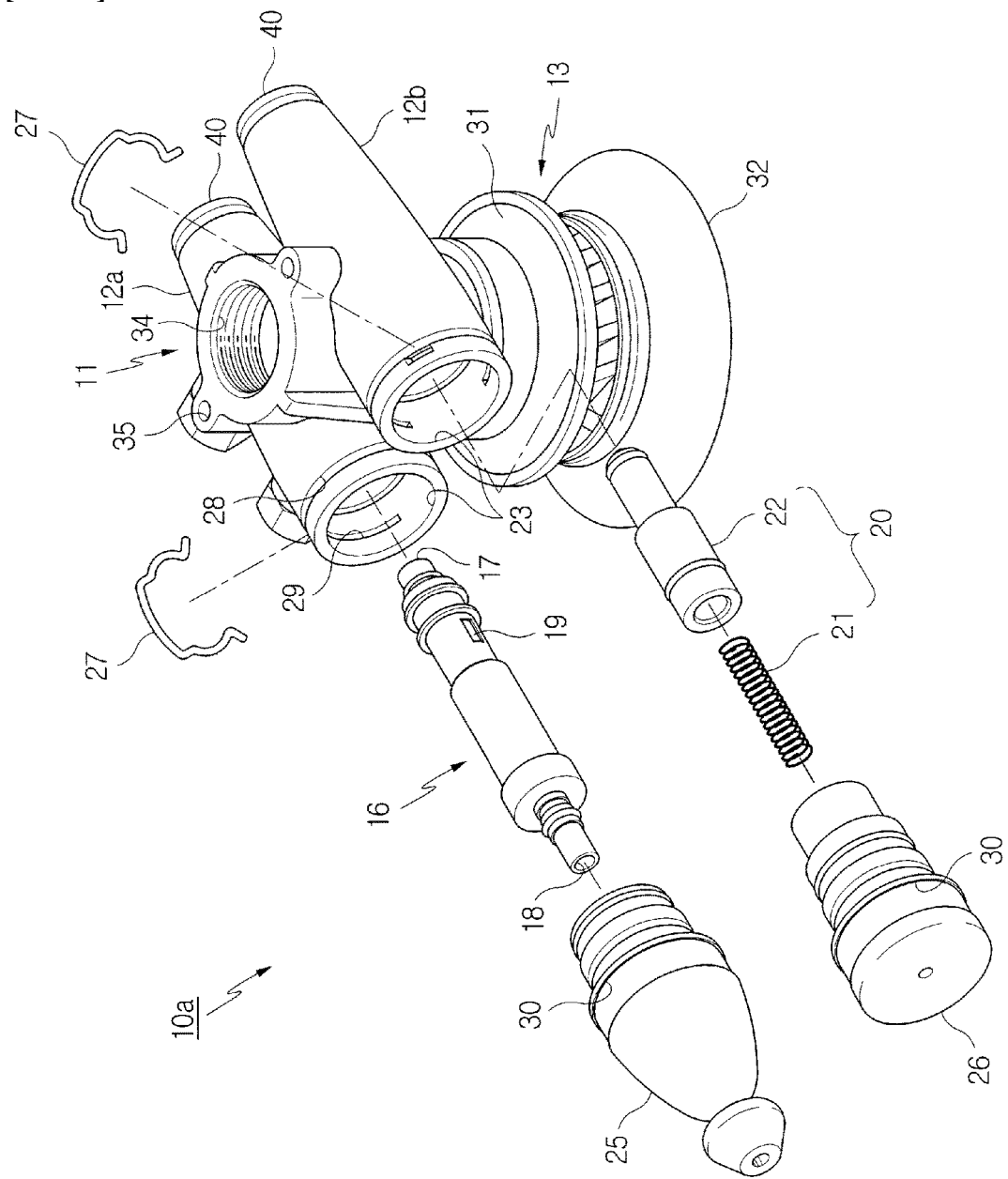

[FIG. 4]
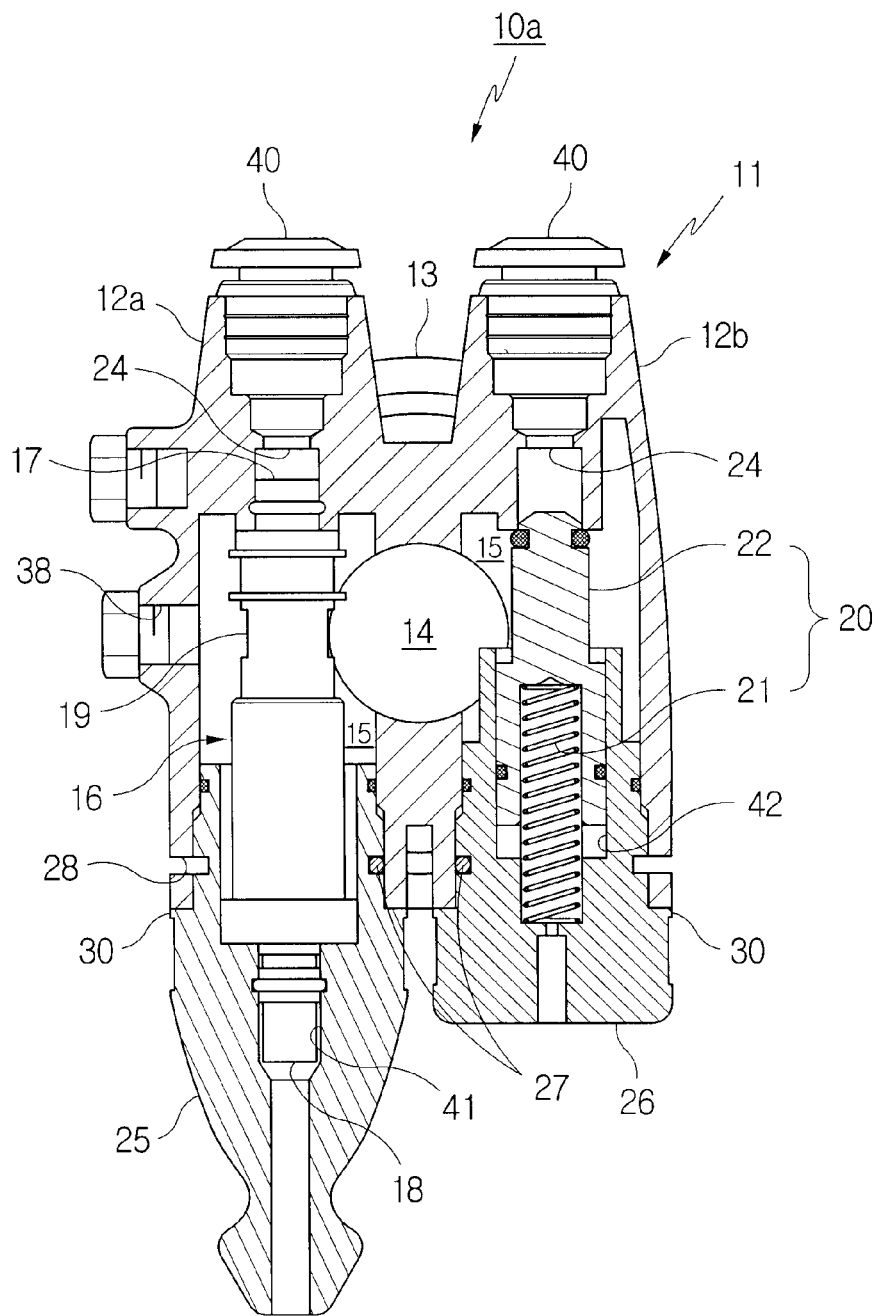

[FIG. 5]
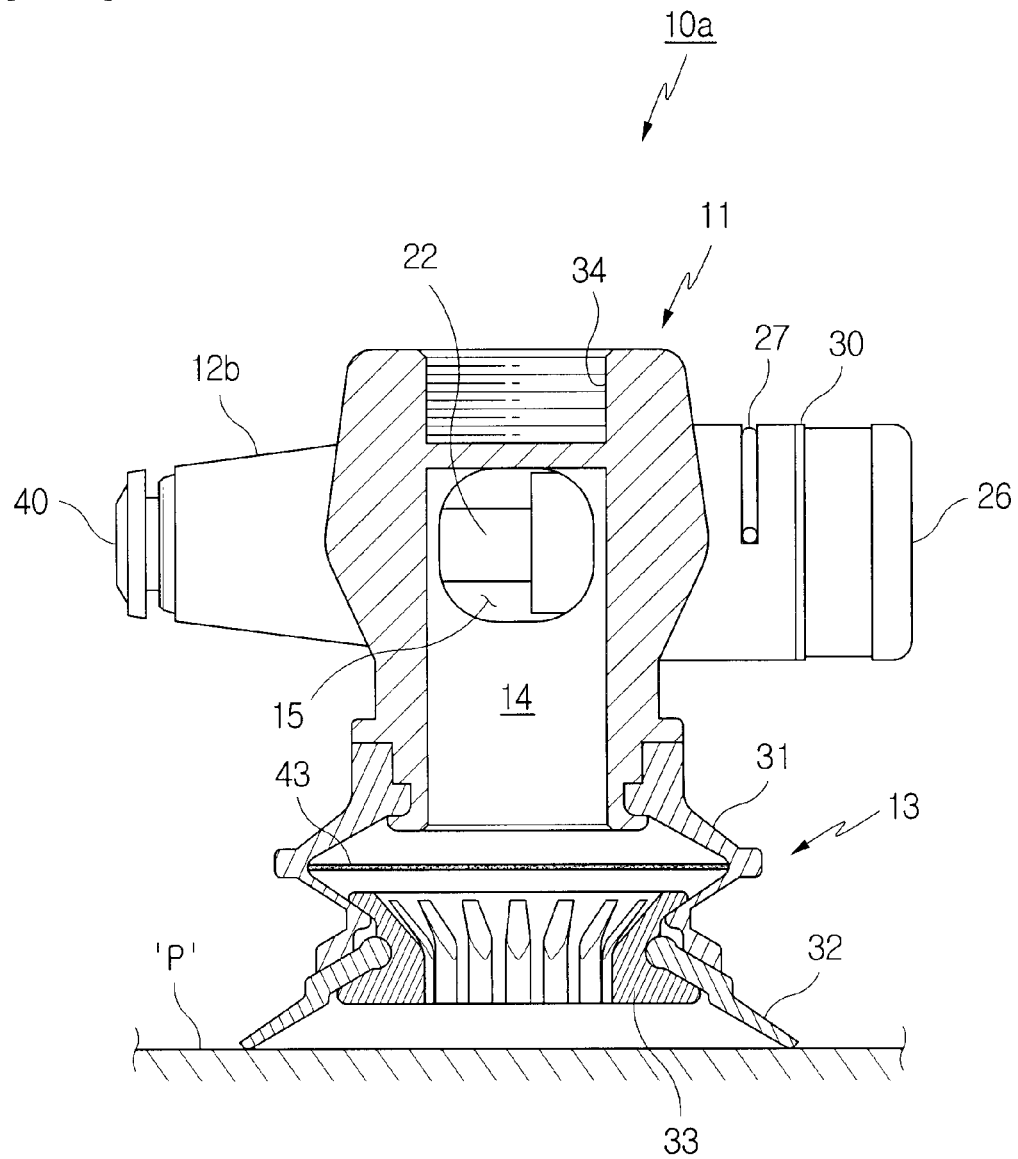

[FIG. 6]
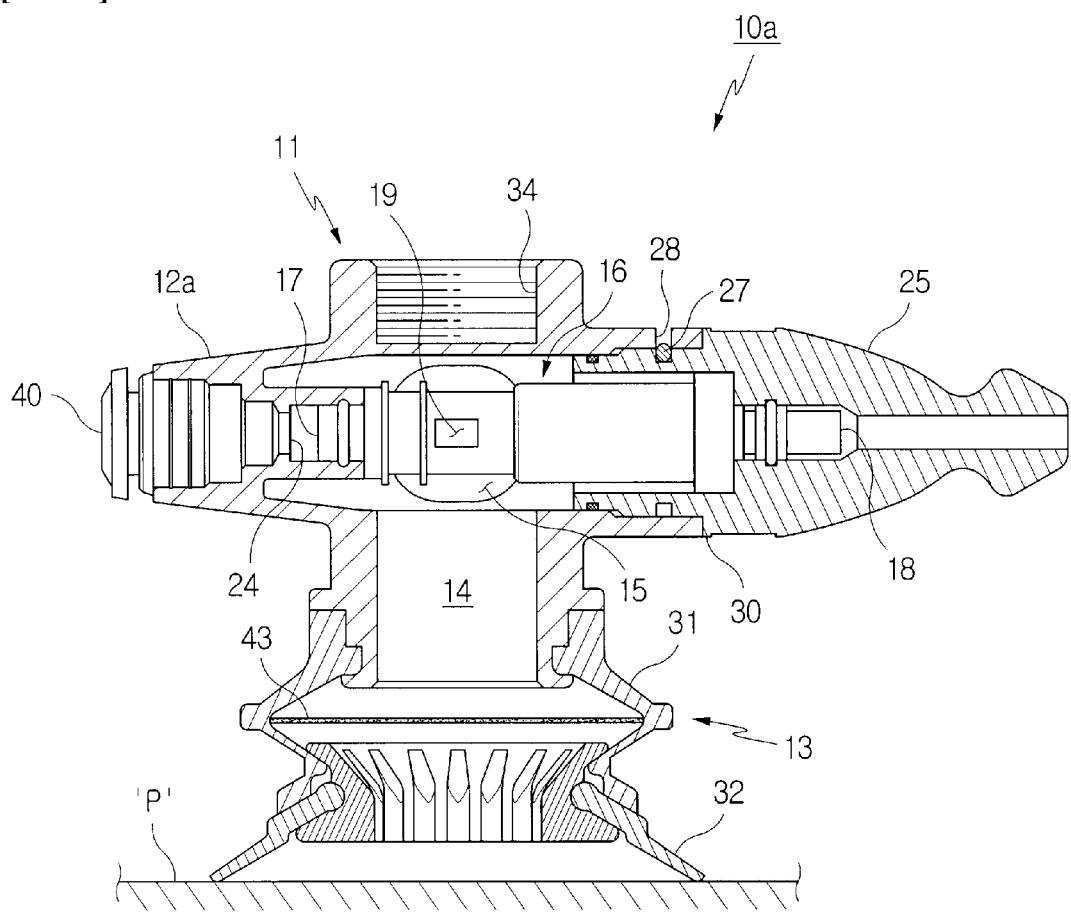

[FIG. 7]
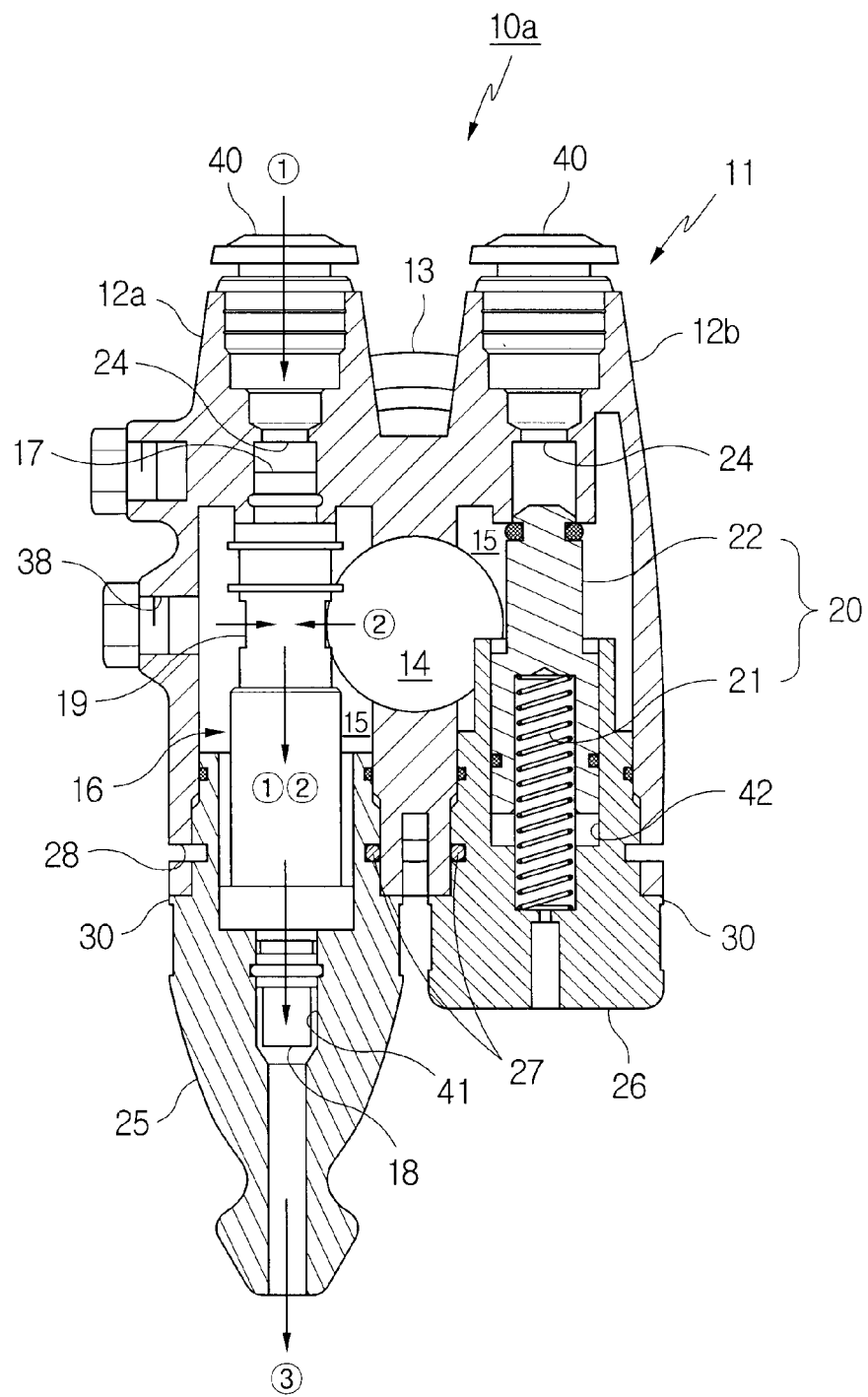

[FIG. 8]
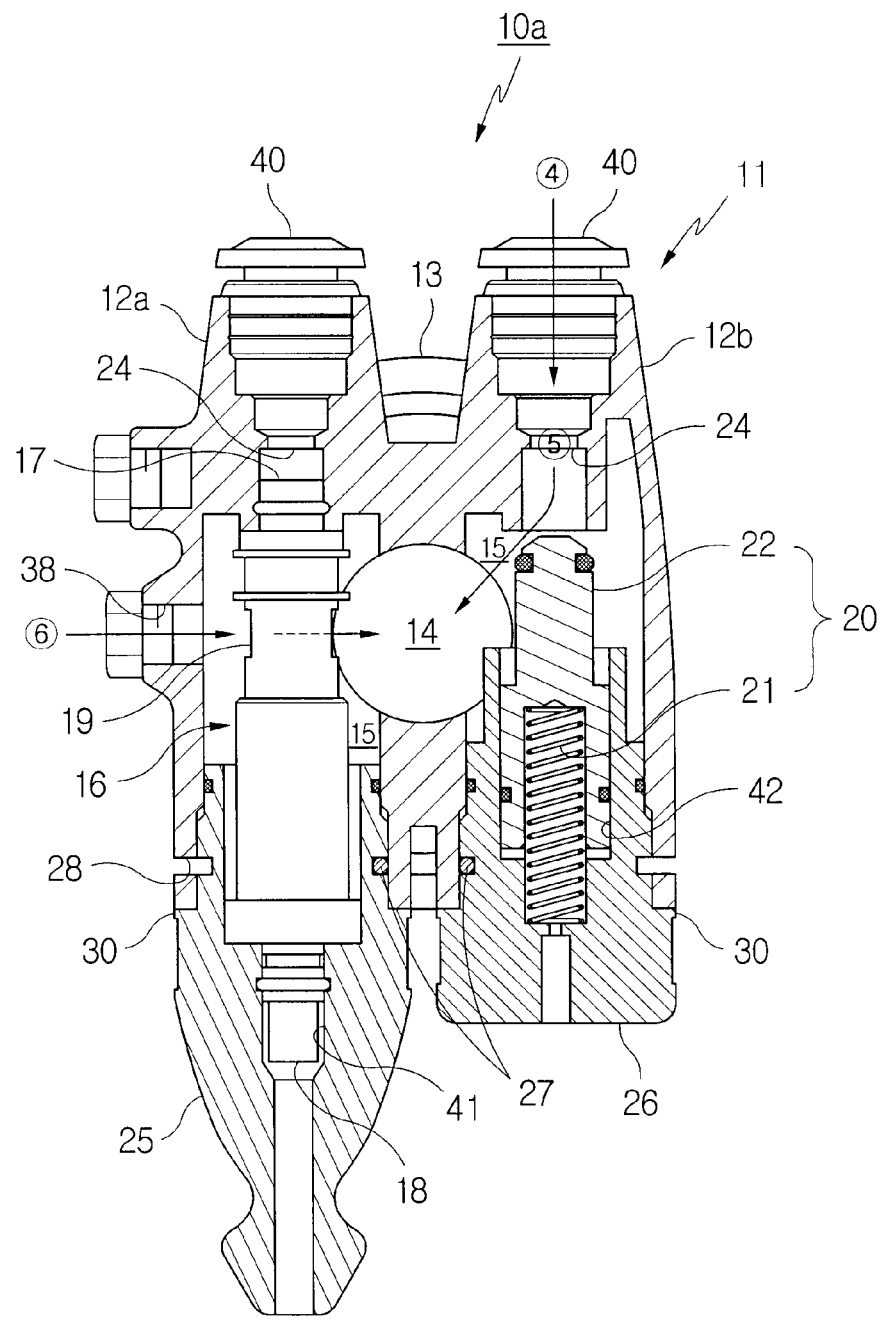

[FIG. 9]
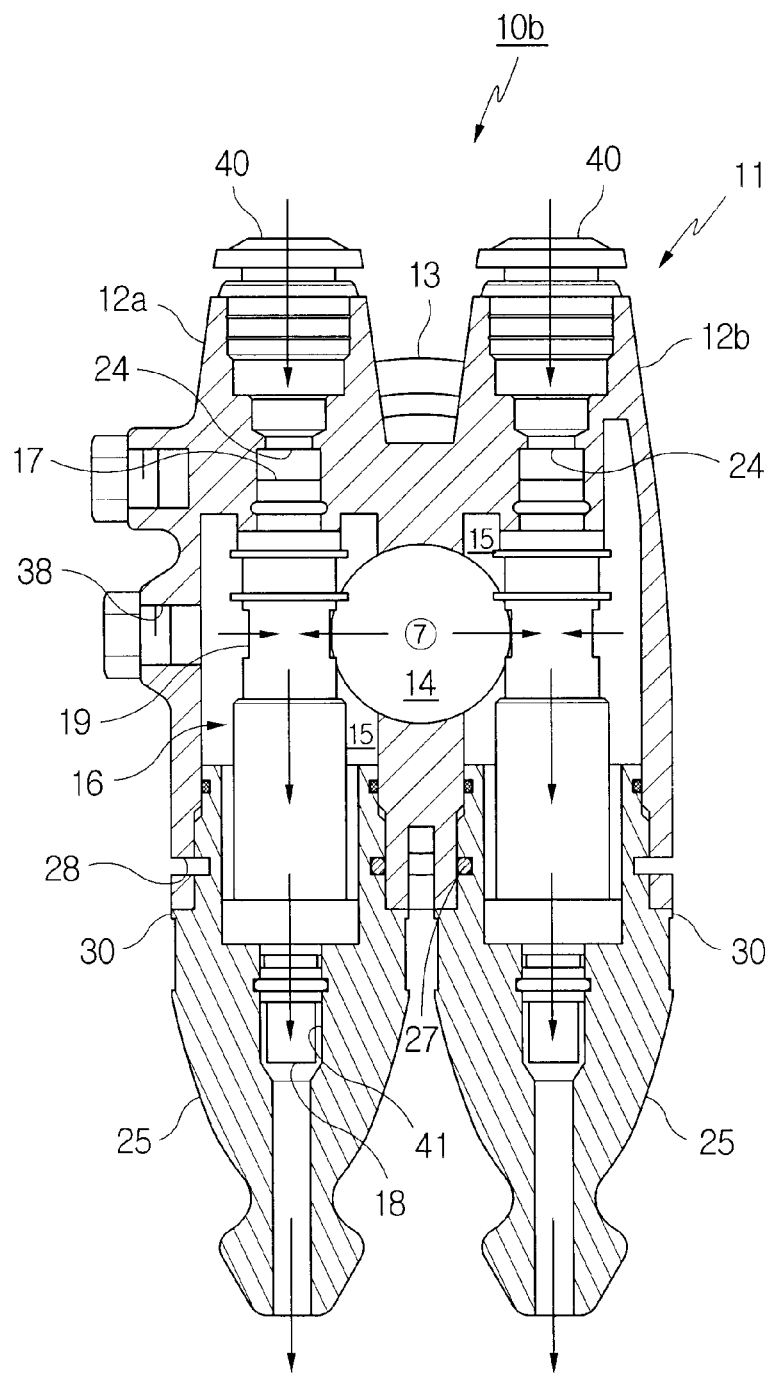

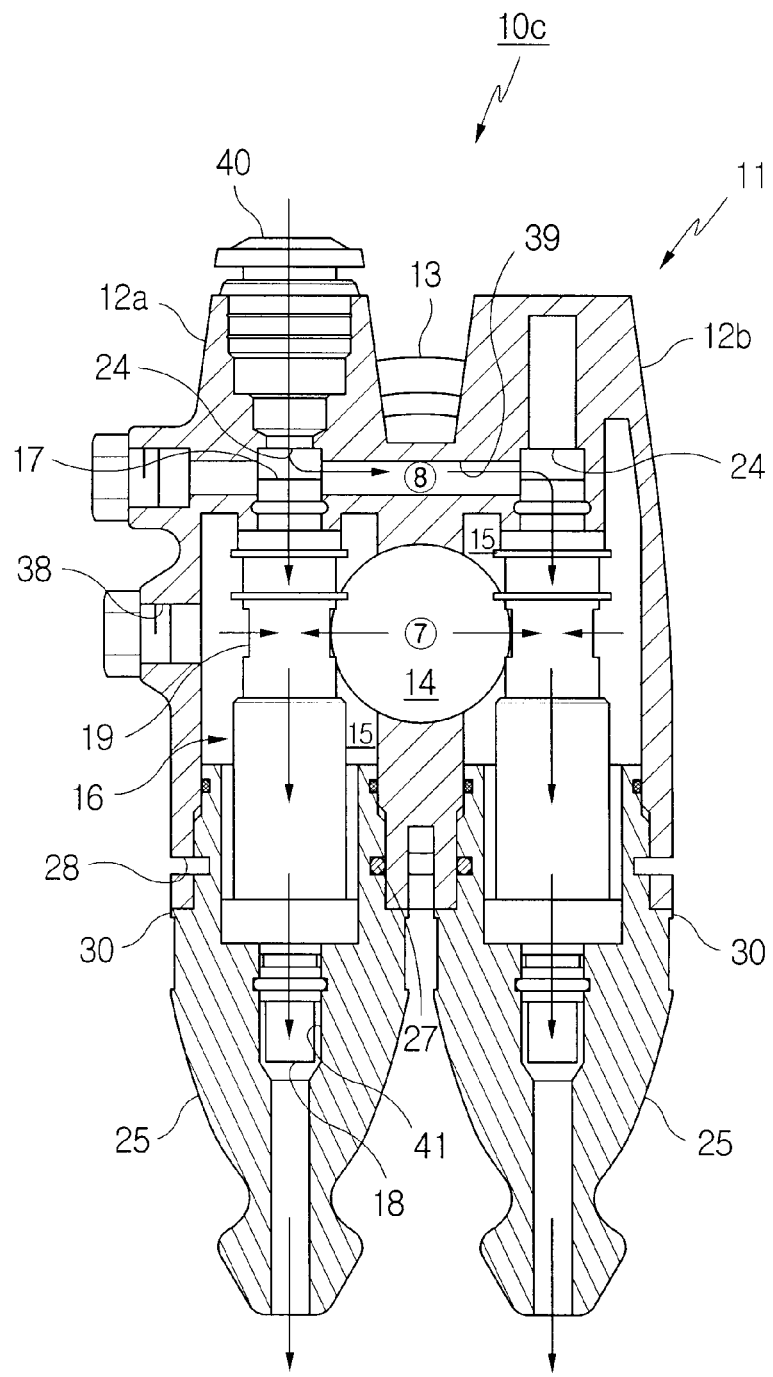
[FIG. 10]

VACUUM GRIPPER UNIT COMPRISING VACUUM PUMP

TECHNICAL FIELD

The present invention relates to a vacuum gripper unit used for gripping an object using a negative pressure created by high-speed compressed air.

BACKGROUND ART

As well known in the art, a typical vacuum gripper system includes a hollow main body, a pad coupled to a lower portion of the main body so as to communicate therewith, and a vacuum pump connected to a side or upper side of the main body by a hose. When high-speed compressed air passes through the vacuum pump while the pad is in contact with an object, air present in the pad is pulled through the stream of the compressed air into the vacuum pump via the main body and the hose, and is discharged to the outside of the vacuum pump together with the compressed air. Herein, a negative pressure is thus created in the pad and this negative pressure acts to suck and grip the object. Thereafter, the gripped object is transported to a desired location by an automation system or the like.

Such a gripper system is currently used effectively, but is problematic in design, wiring, and the like. Accordingly, a vacuum gripper device having a relatively compact structure by mounting a vacuum pump inside a main body has been proposed. It is noted that Korean Patent Application Publication No. 10-2009-0131617 and U.S. Pat. No. 7,540,309 disclosed vacuum devices regarding said vacuum gripper device.

Referring to FIG. 1, the former vacuum gripper device 1 is configured with a 'T' type hollow main body 2, a suction pad 3 coupled to a lower portion thereof, a vacuum pump 4 mounted therein at a first side thereof, and a compressed air supply hole 5 formed therein at a second side thereof. Furthermore, a release valve 6 operated by the pressure of the compressed air is positioned below the compressed air supply hole 5. For reference, the latter device remains substantially the same as the former gripper device 1, except that the release valve 6 is positioned above a '+' type main body and a description there will be omitted herein. In the drawings, reference numeral 7 denotes a silencer.

As in the typical vacuum gripper system described above, when high-speed compressed air passes through the vacuum pump 4 while the suction pad 3 is in contact with an object P, air present in the suction pad 3 is pulled through the stream of the compressed air into the vacuum pump 4 via the main body 2, and is discharged to the outside of the vacuum pump 4 together with the compressed air. Herein, a negative pressure is thus created in the suction pad 3 and this negative pressure acts to suck and grip the object P. Meanwhile, the release valve 6 remains closed by a portion of the supplied compressed air continuously pushing the release valve 6, so that the vacuum inside the vacuum pump 4 can be maintained.

For example, when supply of the compressed air is stopped after transport of the object P, the release valve 6 is caused to be opened by the pressure of a spring acting thereon. Then, external air is permitted to flow into the main body 2 and accordingly the vacuum and the negative pressure in the device are released. The vacuum gripper device 1 is removed from the object P and then prepared for a next gripping process.

DISCLOSURE

Technical Problem

As described above, the vacuum gripper device 1 in the related art is designed to mount the suction pad 3, the vacuum pump 4, the release valve 6, and the like in the main body 2. Thus, it can be said that the vacuum gripper system can be designed and implemented compact in comparison with the conventional art. However, there are the following problems:

First, each of the elements 3, 4, and 6 constituting the vacuum gripper device 1 must be engaged to the 'T' type or '+' type main body 2 in respective directions, leading to inconvenience of assembling and disassembling thereof and low productivity;

Second, particularly the vacuum pump 4 is directly mounted in the main body 2 without provision of an additional mounting space, so that the pressure of supplied compressed air is directly delivered to both the main body 2 and the suction pad 3, leading to low grip reliability;

Third, an arrangement imbalance between the elements 3 and 6 based on the main body 2 affects a grip state defined by the suction pad 3;

Fourth, depending on the site, it may be necessary to select, change, and apply the elements for swiftness of vacuum creation or vacuum release, but there is no preparation for this, leading to limitations in use;

and the like.

Accordingly, the present invention has been made keeping in mind the above problems occurring in the related art, and an objective of the present invention is to provide a compact type gripper device including a vacuum pump, particularly a vacuum gripper unit which enables easy assembly and disassembly of each element, improves a vacuum response speed and grip reliability by means of compressed air, and satisfies an arrangement balance between the elements. Another objective of the present invention is to provide a vacuum gripper unit having excellent applicability by allowing a user to select a mounting element depending on the needs of the site.

Technical Solution

In the embodiment of the present invention, the vacuum gripper unit includes:

a vertical main body having a common vacuum chamber defined therein;

first and second mounting containers that are cylindrical members horizontally arranged on left and right sides of the main body to be parallel to each other, and provide an additional mounting space to the main body, the first and second mounting cylinders having a generally 'H' type when seen from outside, including the main body that connects centers thereof to each other, the first and second mounting cylinders having passages respectively provided at first sides thereof that face each other and communicating with the common vacuum chamber; and a suction pad connected to a lower portion of the main body so as to communicate with the common vacuum chamber, wherein the first mounting container has the vacuum pump inserted and mounted therein and operating to allow exhaust of air from the common vacuum chamber so as to create a vacuum therein upon supply and discharge of compressed air, and the second mounting container selectively has the vacuum pump inserted and mounted therein or a release valve inserted and mounted therein, the release valve being opened to allow the air to flow into the common vacuum chamber when the vacuum pump stops operating.

It is preferable that the second mounting container has the vacuum pump inserted and mounted therein, wherein a distributing passage is formed at a side of the main body to provide communication between the first and second mounting containers without bypassing the common vacuum chamber, such that the compressed air applied to one of the mounting containers is supplied to both the two mounting containers and the vacuum pumps.

Advantageous Effects

The vacuum gripper unit according to the present invention is a compact type vacuum gripper device including the vacuum pump. Particularly, two mounting containers are provided on the outside of the vertical main body to provide an additional mounting space to the main body, the containers being arranged vertically to be parallel to each other, thus having a generally 'H' type when seen from outside, including the main body that connects the centers thereof to each other. Thus, the present invention has the following effects.

1) The vacuum pump and the release valve are easy to assemble and disassemble,

2) The additional mounting space for the vacuum pump is provided to the main body, so that the compressed air does not directly apply pressure or impact to the main body, thus achieving an improvement in grip reliability, 3) It is possible to satisfy an arrangement balance between left and right elements of the main body and thus to achieve grip stability of the pad, and the like.

4) On the other hand, one of the mounting containers must have the vacuum pump mounted therein, while a remaining one has the release valve or the vacuum pump mounted therein according to the embodiment, so that it is possible to effectively cope with the 'swiftness of release' or 'swiftness of vacuum' which is operationally required.

DESCRIPTION OF DRAWINGS

FIG. 1 is a sectional view showing a configuration of a vacuum gripper device in the related art.

FIG. 2 is an external view showing a vacuum gripper unit according to a first embodiment of the present invention.

FIG. 3 is an exploded perspective view showing the vacuum gripper unit of FIG. 2.

FIG. 4 is a cross-sectional view taken along line 'A-A' of FIG. 2.

FIG. 5 is a cross-sectional view taken along line 'B-B' of FIG. 2.

FIG. 6 is a cross-sectional view taken along line 'C-C' of FIG. 2.

FIG. 7 is a view showing a vacuum griping operation of the vacuum gripper unit of FIG. 2.

FIG. 8 is a view showing a vacuum releasing operation of the vacuum gripper unit of FIG. 2.

FIG. 9 is a cross-sectional view showing a vacuum gripper unit according to a second embodiment of the present invention.

FIG. 10 is a cross-sectional view showing a vacuum gripper unit according to a third embodiment of the present invention.

DESCRIPTION OF THE REFERENCE NUMERALS IN THE DRAWINGS

| | |
|---|---|
| 10a, 10b, 10c: vacuum gripper unit | |
| 11: main body | |
| 12a: first mounting container | |
| 12b: second mounting container | |
| 13: suction pad | |
| 14: common vacuum chamber | 15: passage |
| 16: vacuum pump | 17: inlet |
| 18: outlet | 19: through hole |
| 20: release valve | 21: spring |
| 22: piston | |
| 23: front insertion hole | |
| 24: rear air supply hole | |
| 25, 26: finishing material | |
| 27: web | 28: groove |
| 29: hole | 30: step |
| 31: lip holder | 32: lip |
| 33: clamp | 34: screw groove |
| 35: securing depression | 36: bracket |
| 37: support | 38: release port |
| 39: distributing passage | 40: connector |
| 41, 42: recess | 43: filter element |

BEST MODE

The features and operation effects of a vacuum gripper unit including a vacuum pump (hereinafter referred to as a "vacuum gripper unit") according to the present invention, which have been described or are not described herein, will become more apparent from the following description of embodiments with reference to the accompanying drawings. In FIG. 2 and subsequent drawings, the vacuum gripper unit according to the present invention is indicated by reference numerals "10a", "10b", and "10c" depending on the embodiments.

First Embodiment

Referring to FIGS. 2 to 6, a vacuum gripper unit 10a according to the present invention includes a vertical main body 11, cylindrical first and second mounting containers 12a and 12b integrally formed on left and right sides of the main body 11, respectively, and providing an additional mounting space to the main body 11, and a suction pad 13 connected to a lower portion of the main body 11. As shown in the drawings, the main body 11 is an inverted U-type body having a common vacuum chamber 14 defined therein, and the suction pad 13 is configured to communicate with the vacuum chamber 14.

Specifically, the first and second mounting containers 12a and 12b are arranged horizontally to be parallel to each other such that centers thereof are connected to each other by the main body 11, thus having a generally 'H' type when seen from outside, including the main body. The first and second mounting containers include passages 15 respectively provided at first sides thereof that face each other and communicating with the common vacuum chamber 14 in the main body 11. Furthermore, in the present embodiment, the first mounting container 12a has a vacuum pump 16 mounted therein, and the second mounting container 12b has a release valve 20 mounted therein.

Herein, the mounted vacuum pump 16 is a pipe type vacuum pump in which first and opposite second ends thereof are an inlet 17 and an outlet 18 for compressed air, respectively, and a side wall thereof has a through hole 19 formed therein so as to communicate with the vacuum chamber 14. The release valve 20 is a valve configured such that a piston 22 supported against a spring 21 is moved between an opened position and a closed position of the valve depending on the presence or absence of the pressure of compressed air, thus controlling inflow of air into the vacuum chamber 14. However, those skilled in the art will note that there is nothing special about the vacuum pump 16 and the release valve 20 themselves constituting and acting in this manner in the present invention or in the present embodiment.

Furthermore, in each embodiment of the present invention, the release valve 20 is designed to have a structure in which the piston 22 is caused to be moved in a first direction by the pressure of compressed air supply acting thereon to open the valve, whereas when compressed air supply is stopped, the piston is caused to be moved in an opposite second direction by the pressure of the spring 21 acting thereon to close the valve. Alternatively, as in a release valve 6 shown in FIG. 1, the release valve may be designed to have a structure in which the piston 22 is caused to be moved in the first direction by the pressure of compressed air supply to close the valve, whereas when compressed air supply is stopped, the piston is caused to be moved in the opposite second direction by the pressure of the spring 21 acting thereon to open the valve.

The vacuum pump 16 may be mounted in the first mounting container 12a in such a manner that the inlet 17 is inserted through a front insertion hole 23 of the first mounting container 12a into a rear air supply hole 24 so as to communicate therewith. Similarly, the release valve 20 may be mounted in the second mounting container 12b in such a manner that an end portion of the piston 22 is inserted through a front insertion hole 23 of the second mounting container 12b so as to open and close a rear air supply hole 24.

Furthermore, the first mounting container 12a and the second mounting container 12b are provided with finishing materials 25 and 26 inserted into front sides thereof, such that the vacuum pump 16 and the release valve 20 mounted in the containers are retainably supported and prevented from being separated therefrom. Herein, a generally 'C'-shaped web 27 is provided for rigid coupling of each of the finishing materials 25 and 26. The web 27 is elastically inserted into a groove 28 formed on an outer surface of each container at a side thereof where the front insertion hole 23 is formed, and portions thereof pass through a hole 29 formed in the groove 28 so as to be caught by a step 30 formed on an outer surface of each of the finishing materials 25 and 26.

Thus, upon disassembly, webs 27 are removed from sides of the containers where the front insertion holes 23 are formed such that the finishing materials 25 and 26, the vacuum pump 16, and the release valve 20 are separated from each other. It is preferable that the finishing material 25 of the first mounting container 12a includes a recess 41 formed therein such that the outlet 18 of the vacuum pump 16 is inserted into the recess, while the finishing material 26 of the second mounting container 12b includes a recess 42 formed therein such that the release valve 20 is inserted into the recess. It is more preferable that the finishing material 25 of the first mounting container 12a is a hollow silencer.

The suction pad 13 is connected to the lower portion of the main body 11 so as to communicate with the vacuum chamber 14, and a lower edge thereof comes into contact with the surface of an object P to be gripped. Specifically explained, the suction pad 13 includes a bellows-type lip holder 31 coupled to a lower end portion of the main body 11, and a skirt-like lip 32 coupled to a lower portion of the lip holder 31 in an integrated manner or in a removable manner, and coming into contact with the surface of the object P. Reference numeral 33 denotes a ring-shaped clamp for compressing a contact portion between the lip holder 31 and the lip 32 that are provided in a removable manner. By using this clamp 33, the suction pad 13 may further include at least one middle bellows placed between the lip holder 31 and the lip 32 and having upper and lower ends coupled to the lip holder 31 and the lip 32, respectively.

The structure of the suction pad 13 shown in the present embodiment is a structure in which the respective elements 31, 32, and 33 are coupled to each other in a removable manner, which is not different from that disclosed in Korean Patent No. 1303740. As shown in the drawings, the suction pad 13 includes a filter element 43 inserted and seated in an inner diameter of the lip holder 31 such that dust or foreign substances present on the surface of the object P are filtered out. However, the present invention is not limited to the specific configuration of the suction pad 13 described above.

Meanwhile, the vacuum gripper unit 10a further includes means for providing optimal connection to an automated transport system. As such means, the main body 11 includes a screw groove 34 centrally formed on an upper surface thereof, and at least one securing depression 35 or at least one protrusion formed outwardly of the upper surface of the main body such that multiple securing depressions or multiple protrusions are formed at positions opposite to each other. For example, as shown in FIG. 2, a bracket 36 may be secured by a support 37 inserted into the screw groove 34, wherein the securing depressions 35 are correspondingly engaged with protrusions of the bracket 36 formed on a surface thereof whereby movement or rotation of the bracket 36 can be prevented.

Referring to FIG. 7, high-speed compressed air is first supplied to the rear air supply hole 24 of the first mounting container 12a (see arrow ①) and then flows into the inlet 17 of the vacuum pump 16 to flow to the outlet 18. During this process, air present in the vacuum chamber 14 and the suction pad 13 is pulled into the vacuum pump 16 through the passage 15 and the through hole 19 (see arrow ②) and is then discharged through the outlet 18 together with compressed air (see arrow ③), whereby a vacuum is created in the vacuum chamber 14 and a negative pressure is created in the suction pad 13 at the same time. Herein, the end of the piston 22 of the release valve 20 extended by the pressure of the spring 21 acting thereon closes the rear air supply hole 24 of the second mounting container 12b.

This negative pressure created in the suction pad acts to suck and grip the object (see P of FIG. 6), and accordingly transport of the object P can be performed by the automated transport system. When the transport is completed, the discharge operation of the vacuum pump 16 described above is stopped, while at the same time the release valve 20 is operated to allow inflow of external air, whereby the suction pad 13 can be swiftly released from the object P.

In this case, referring to FIG. 8, high-speed compressed air is supplied to the rear air supply hole 24 of the second mounting container 12b (see arrow ④), and the pressure of compressed air supply causes the piston 22 to be moved to open the release valve 20 such that air flows into the vacuum chamber 14 and the suction pad 13 (see arrow ⑤). Accordingly, the created vacuum and negative pressure are released, thus permitting the suction pad 13 and the object P to be released from each other. Reference numeral 38 denotes a release port formed at a second side of the first mounting container 12a. For example, when compressed air is supplied to the port 38 (see arrow ⑥), this provides an advantage of enabling more swift release of the negative pressure and more swift release of the object P irrespective of the operation of the release valve 20.

Second Embodiment

A vacuum gripper unit 10b according to the present embodiment is based on the vacuum gripper unit 10a according to the first embodiment. In other words, the vacuum gripper unit 10b includes:

a vertical main body 11 providing a common vacuum chamber 14 defined therein;

first and second mounting containers 12a and 12b that are cylindrical members integrally formed on left and right sides of the main body 11, respectively, and arranged horizontally to be parallel to each other, the first and second mounting containers providing an additional mounting space to the main body 11, the first and second mounting containers having a generally 'H' type when seen from outside, including the main body 11 that connects centers thereof to each other, the first and second mounting containers having passages 15 respectively provided at first sides thereof that face each other and communicating with the common vacuum chamber 14; and a suction pad 13 connected to a lower portion of the main body 11 so as to communicate with the vacuum chamber 14.

Referring to FIG. 9, there is a difference in that each of the first and second mounting containers 12a and 12b has a vacuum pump 16 inserted and mounted therein and operating to allow exhaust of air from the common vacuum chamber 14 so as to create a vacuum therein upon supply and discharge of compressed air. Hence, if the vacuum gripper unit 10a according to the first embodiment is advantageous in terms of swiftness of vacuum release, the vacuum gripper unit 10b according to the present embodiment can be said to be advantageous in terms of swiftness of vacuum creation.

Herein, the construction in which the vacuum pump 16 is mounted in the second mounting container 12b and the operation thereof remain the same as the construction in which the vacuum pump 16 is mounted in the first mounting container 12a and the operation thereof, so an additional description thereof will be omitted. Characteristically, high-speed compressed air is simultaneously supplied to rear air supply holes 24 of the first mounting container 12a and the second mounting container 12b to pass through respective vacuum pumps 16, resulting in two vacuum pumps 16 allowing exhaust of air from the common vacuum chamber 14 and from the suction pad 13 (see arrow ⑦). Thus, the vacuum gripper unit 10a can be said to be advantageous in terms of swiftness of vacuum creation.

The problem of releasing the vacuum can be effectively solved by supplying compressed air to the release port 38 (see arrow ⑥ in FIG. 8).

Third Embodiment

A vacuum gripper unit 10c according to the present embodiment is based on the vacuum gripper unit 10b according to the second embodiment. In other words, the vacuum gripper unit 10c includes:

a vertical main body 11 providing a common vacuum chamber 14 defined therein;

first and second mounting containers 12a and 12b that are cylindrical members integrally formed on left and right sides of the main body 11, respectively, and arranged horizontally to be parallel to each other, the first and second mounting containers providing an additional mounting space to the main body 11, the first and second mounting containers having a generally 'H' type when seen from outside, including the main body 11 that connects centers thereof to each other, the first and second mounting containers having passages 15 respectively provided at first sides thereof that face each other and communicating with the common vacuum chamber 14; and a suction pad 13 connected to a lower portion of the main body 11 so as to communicate with the vacuum chamber 14, wherein each of the first and second mounting containers has a vacuum pump inserted and mounted therein and operating to allow exhaust of air from the common vacuum chamber so as to create a vacuum therein upon supply and discharge of compressed air.

Referring to FIG. 10, in the present embodiment, there is a difference in that a distributing passage 39 is formed at a side of the main body 11 to provide communication between the first and second mounting containers without bypassing the vacuum chamber, whereby compressed air applied to one mounting container 12a is supplied to both the two mounting containers 12a and 12b. Specifically explained, compressed air supplied to a rear air supply hole 24 of the first mounting container 12a is supplied to a rear air supply hole 24 of the second mounting container 12b (see arrow ⑧), resulting in compressed air being supplied to both the first and second mounting containers 12a and 12b.

In fact, it can be said that such a design is advantageous over a design of the vacuum gripper unit 10b in terms of energy efficiency and wiring. The operation in which two vacuum pumps 16 allow exhaust of air from the common vacuum chamber 14 and from the suction pad 13 (see arrow ⑦) is the same as that of the vacuum gripper unit 10b according to the second embodiment. Furthermore, the problem of releasing the vacuum can be solved by supplying compressed air to a release port 38 (see arrow ⑥ in FIG. 8).

The figure shows a state in which a rear end portion of the second mounting container 12b is completely closed and is unopenable. However, this state does not have a significant operational difference as compared to the case where a connector 40 shown in FIGS. 2 to 9, which is configured to be openable, is applied to the closed end portion of the second mounting container.

The invention claimed is:

1. A vacuum gripper unit including a vacuum pump, the vacuum gripper unit comprising:

a vertical main body (11) having a common vacuum chamber (14) defined therein;

first and second mounting containers (12a and 12b) that are cylindrical members horizontally arranged on left and right sides of the main body to be parallel to each other, and provide an additional mounting space to the main body (11), the first and second mounting cylinders having a generally 'H'-shape when seen from outside, including the main body (11) that connects centers thereof to each other, the first and second mounting cylinders having passages (15) respectively provided at first sides thereof that face each other and communicating with the common vacuum chamber; and a suction pad (13) connected to a lower portion of the main body (11) so as to communicate with the common vacuum chamber (14), wherein the first mounting container (12a) has the vacuum pump (16) inserted and mounted therein and operating to allow exhaust of air from the common vacuum chamber (14) so as to create a vacuum therein upon supply and discharge of compressed air, and the second mounting container (12b) selectively has the vacuum pump (16) inserted and mounted therein or a release valve (20) inserted and mounted therein, the release valve being opened to allow air to flow into the common vacuum chamber (14) when the vacuum pump stops operating; and wherein the vacuum pump (16) is a pipe vacuum pump in which first and second ends thereof are an inlet (17) and an outlet (18) for the compressed air, respectively, and a side wall thereof has a through hole (19) formed therein so as to communicate with the common vacuum chamber (14), and the vacuum pump is mounted in the first mounting container (12a) in such a manner that the inlet (17) is inserted through a front insertion hole (23) of the first mounting container (12a) into a rear air supply hole (24) so as to communicate therewith, the vacuum pump being mounted in the second mounting container (12b) in the manner as above described.

2. The vacuum gripper unit of claim 1, wherein the release valve (20) is a valve configured such that a piston (22) supported against a spring (21) is moved between an opened position and a closed position of the valve depending on presence or absence of pressure of the compressed air, thus controlling inflow of air into the common vacuum chamber (14), and the release valve is mounted in the second mounting container (12b) in such a manner that an end portion of the piston (22) is inserted through a front insertion hole (23) of the second mounting container (12b) into a rear air supply hole (24) so as to open and close the rear air supply hole.

3. The vacuum gripper unit of claim 1, wherein the suction pad (13) includes:
a lip holder (31) coupled to a lower end portion of the main body (11) in an attachable and detachable manner; and
a skirt-shape lip (32) coupled to a lower portion of the lip holder (31) and coming into contact with a surface of an object (P).

4. The vacuum gripper unit of claim 3, wherein the suction pad (13) further includes:
a filter element (43) inserted and seated in an inner diameter of the lip holder (31) such that dust or foreign substances present on the surface of the object (P) are filtered out.

5. The vacuum gripper unit of claim 1, wherein the first mounting container (12a) and second mounting container (12b) are provided with finishing materials (25 and 26) inserted into front insertion holes (23) thereof, such that the vacuum pump (16) and the release valve (20) mounted in the containers are retainably supported and prevented from being separated therefrom.

6. The vacuum gripper unit of claim 5, wherein
among the first and second mounting containers (12a and 12b), the finishing material (25) of the container (12a) having the vacuum pump (16) therein or the containers (12a and 12b) each having the vacuum pump therein is a hollow silencer, the silencer being inserted into the front insertion hole (23) of the mounting container (12a) or each of the front insertion holes of the mounting containers (12a and 12b) such that an outlet (18) of the vacuum pump (16) is inserted into the silencer.

7. The vacuum gripper unit of claim 5, wherein 'C'-shaped web (27) is elastically inserted into a groove (28) formed on an outer surface of each of the containers at a side thereof where the front insertion hole (23) is formed, and portions thereof pass through a hole (29) formed in the groove (28) so as to be caught by a step (30) formed on an outer surface of each of the finishing materials (25 and 26), such that upon disassembly of the finishing materials (25 and 26), webs (27) are first removed from sides of the containers where the front insertion holes (23) are formed.

8. The vacuum gripper unit of claim 1, wherein the main body (11) includes:
a screw groove (34) provided to secure the vacuum gripper unit to an external bracket, and centrally formed on an upper surface thereof; and
at least one securing depression (35) or at least one protrusion formed outwardly of the upper surface of the main body.

9. The vacuum gripper unit of claim 1, wherein the second mounting container (12b) has the vacuum pump (16) inserted and mounted therein, wherein
a distributing passage (39) is formed at a side of the main body (11) to provide communication between the first and second mounting containers (12a and 12b) without bypassing the common vacuum chamber (14), such that the compressed air applied to one of the mounting containers (12a and 12b) is supplied to both the two mounting containers (12a and 12b) and the vacuum pumps (16).

10. The vacuum gripper unit of claim 1, wherein the first mounting container (12a) or the second mounting container (12b) has a release port (38) formed at a second side thereof and supplying air to the common vacuum chamber (14) upon release of the vacuum and a negative pressure.

* * * * *